United States Patent Office 3,632,606
Patented Jan. 4, 1972

3,632,606
FLUORINATED ORGANIC CYCLIC PEROXIDES AND PROCESS THEREFOR
Richard L. Talbott and Phillip G. Thompson, White Bear Lake, Minn., assignors to Minnesota Mining and Manufacturing Company, St. Paul, Minn.
No Drawing. Continuation-in-part of application Ser. No. 397,669, Sept. 14, 1964. This application May 20, 1968, Ser. No. 730,598
Int. Cl. C07d 11/00
U.S. Cl. 260—338  5 Claims

ABSTRACT OF THE DISCLOSURE

The specification discloses highly fluorinated compounds each containing a 3 to 16 membered ring which includes a carbon-bonded peroxide group. These compounds are prepared by fluorinating a compound having 2 oxygen atoms bonded to carbon to effect ring closure to form the peroxide-containing ring. The compounds of the invention are useful as oxidants and as polymerization initiators.

CROSS REFERENCE TO RELATED APPLICATIONS

This is a continuation-in-part of our copending application Ser. No. 397,669 filed September 14, 1964 and now abandoned.

SUMMARY OF THE INVENTION

This invention relates to a new class of fluorinated oxidant compounds. More particularly, it relates to new highly fluorinated cyclic peroxides and to a process for their preparation.

Generally, although they are energetic oxidants, the compounds of the invention are much more stable thermally than the corresponding hydrocarbon cyclic peroxides which may react violently under ordinary conditions. The compounds of the invention are therefore considerably more easily handled, a fact which enhances their utility greatly. In addition to their utility as oxidants, they are useful as initiators in the polymerization of ethylenically unsaturated monomers.

It is an object of the present invention to provide a new class of fluorinated oxidant compounds. It is another object of the invention to provide highly fluorinated organic cyclic peroxides. It is another object of the invention to provide a process for the production of highly fluorinated cyclic peroxides. Other objects of the invention will become apparent from reading the following disclosure.

The compounds of the invention include gases, oily or waxy materials and solids, depending in large measure upon their molecular weights. They are highly fluorinated organic cyclic peroxides having a 3 to 16 membered ring containing carbon and one or two peroxy groups, said ring having substituents which are electronegative and non-reducing with respect to the peroxide group and which have Hammett meta substituent constants greater than +0.3, said substituents including bridging atoms (in some of the compounds). The Hammett constants are defined in the article by H. H. Jaffe, Chemical Reviews, vol. 53, pages 191–261. (1953). Such groups include $NF_2$, $=NF$, $NO_2$, $ONF_2$, F, Cl, Br, highly fluorinated organic groups, particularly perfluorinated organic groups (especially perfluoroalkyl radicals) partially fluorinated perhalogenated organic groups (e.g. $CF_2Cl$—) etc. Some of these ($NF_2$, $=NF$, $NO_2$ and $ONF_2$) are oxidizing groups which contribute significant additional oxidizing power to the compounds. The compounds of the invention include the perfluorocarbon cyclic peroxides, i.e. those which contain only carbon and fluorine in addition to the cyclic peroxide group or groups, as well as those which contain only oxidizing groups (such as those just mentioned) in addition to carbon, fluorine and the cyclic peroxide groups. The peroxide-containing ring can also include hetero atoms, such as oxygen, nitrogen and sulfur. Preferably, the compounds of the invention contain not more than 18 carbon atoms.

Fully equivalent with the perfluoroalkyl radicals for purposes of the present invention are perfluoroalkyl radicals containing perfluorinated carbocyclic and heterocyclic rings, for example, perfluoropiperidyl, as well as perfluorocyclohexyl, perfluorocyclohexylethyl and the like radicals. As used herein, the term perfluorocarbon cyclic peroxide includes compounds containing such groups. Likewise, the perfluoroalkyl radicals can be substituted with certain electronegative groups which may replace one or more fluorine atoms or $CF_3$ groups.

Broadly speaking, the process of the invention consists in direct fluorination of compounds having a molecular structure in which at least two oxygen atoms are directly bonded to carbon, e.g. in carbonyl, carboxyl, ester, orthoester, carbinol, ether, and the like groups.

Ring closure to form the highly fluorinated cyclic peroxides can be accomplished by formation of a bond between two oxygen atoms. The fluorination apparently provides conditions which are conducive to the ring closure. The two oxygen atoms may be carried by different carbon atoms in the precursor. If two oxygen atoms are bonded to the same carbon atom in the precursor structure, a three membered peroxy-containing ring can be formed. Alternatively, if two such groups are involved in the ring formation the resulting ring can contain two peroxide groups. Coupling, combination, modification, cleavage and fluorination of carbon chains, e.g. side chains, may occur in the proces. In certain cases carbon chains longer than those of the starting materials are produced. Table I (in which $R^1$ and $R^2$ represent structural portions of the starting material, $R^1_f$ and $R^2_f$ represent corresponding highly fluorinated structural portions of the compounds of the invention, M represents a metal ion and $n$ represents the valence of M) illustrates several general types of these reactions.

TABLE I

| Reactant | Product |
|---|---|
| $-\overset{O}{\underset{R^1}{\overset{\|}{C}}}\diagdown\diagup\overset{O}{\overset{\|}{C}}-$ | $-C\diagdown\overset{O-O}{\underset{R^1_f}{\diagup}}C-$ |
| $\overset{O}{\underset{R^1}{\overset{\|}{C}}}-R_2-\overset{O}{\overset{\|}{C}}$ | $-C\diagdown\overset{O-O}{\underset{R^1_f}{\diagup}}R_{2f}-C-$ |
| $\overset{M/n}{\underset{R^1}{\diagdown}}\overset{O}{\underset{}{\overset{\|}{C}}}-$ $-\overset{O}{\overset{\|}{C}}$ | $-C\diagdown\overset{O-O}{\underset{R^1_f}{\diagup}}C-$ |
| $-\overset{OH}{\underset{R^1}{\overset{\|}{C}}}\diagdown\diagup\overset{O}{\overset{\|}{C}}-$ | $-C\diagdown\overset{O-O}{\underset{R^1_f}{\diagup}}C$ |
| $HOC\diagdown_{R^1}\diagup COH$ | $-C\diagdown\overset{O-O}{\underset{R^1_f}{\diagup}}C-$ |

TABLE I—Continued

| Reactant | Product |
|----------|---------|
| (chemical structures) | (chemical structures) |

Highly fluorinated linear polymers with repeating units containing rings which include carbon-bonded peroxide groups can result from the fluorination of polymeric chelates according to the process of the invention and polymers containing cyclic diperoxides can be produced from the fluorination of dicarboxylic acid salts in the same way. Although mono- and di-peroxides are the major cyclic peroxides isolated in the examples, fluorine-containing cyclic triperoxides can also be formed by processes described herein.

The process of the invention involves treating an oxygen-containing reactant compound as described herein with elemental fluorine at a temperature in the range of from about —100° C. to about +50° C. The apparatus used is preferably constructed from Monel metal or copper. Solid, liquid or gaseous starting materials can be used. Where the reactants contain phenolic, enolic, acidic or other salt-forming oxygen groups, it is preferred to use the corresponding metal salts as starting materials for the direct fluorination. For this purpose, alkali metals, alkaline earth metals, transition metals such as nickel and the like can be used. Salts (or metal chelates) are conveniently used when carboxylic acids are employed as starting materials and beta-diketones are conveniently used in the form of the metal chelates. Negatively substituted 1,3-dioxanes, however, can be easily used as such.

Illustrative of the starting materials useful in the present process are chelates of acetylacetone derivatives, such as 3-bromoacetylacetone, hexafluoroacetylacetone, etc.; chelates of perfluorobiacetyl hydrate [J. Org. Chem. 30, 2472 (1965)]; salts of fluorocarbon acids such as perfluorohexanoic acid, perfluorodecanoic acid, chlorodifluoroacetic acid, and nitrodifluoroacetic acid,

HOOCCF$(CF_3)$O$(CF_2)_3$OCF$(CF_3)$COOH,

HOOCCF$(CF_3)$O$(CF_2)_5$OCF$(CF_3)$COOH (U.S. Pat. 3,250,807),

where $r$ is 1 to 3 (U.S. Pat. 3,250,806); tetrahydroperfluoroalkanediols such as 2,2-difluoropropane-1,3-diol and 1,1,5,5-tetrahydroperfluoropentane-1,5-diol; mono- and dipotassium salts of nitromalonic acid; 2-chloro-2,3,3-trifluorobutane - 1,4 - diol; 1,2-bis(difluoroamino)ethylene glycol; disodium salt of omega, omega, omega-trifluoroacetoacetic acid; and the like. Table II exemplifies a number of compounds which are suitable starting materials for the process as well as the products of the invention produced from them.

TABLE II

| Reactant | Product |
|----------|---------|
| (chemical structures) | (chemical structures) |

TABLE II—Continued

| Reactant | Product |
|---|---|
| CF₃C(O-O-Cu/2)(OH)CF₃ | CF₃-CF(O-O)CF-CF₃ (4-membered peroxide ring) |
| CF₃CF(OLi)-CF(OLi)CF₃ | CF₃-CF(O-O)CF-CF₃ |
| CF₃CF₂CF₂C(OH)(CH₃)CH₂C(O)CF₂CF₂CH₃ | CF₃(CF₂)₂C(O-O)(CF₃)(CF₂F) — CCF₂CF₂CF₃ (5-membered peroxide ring) |
| HOCH₂CF₂CH₂OH | CF₂(O-O)CF₂–CF₂ ring |
| HOCH₂(CF₂)₄CH₂OH | CF₂(O-O)CF₂–(CF₂)₄ ring |
| CF₃(CF₂)₆CO₂Na | CF₃(CF₂)₆CF(O-O)(O-O)FC(CF₂)₆CF₃ |
| CF₃(CF₂)₄CO₂Na | CF₃(CF₂)₄CF(O-O)(O-O)FC(CF₂)₄CF₃ |
| NaOOCCF(CF₃)O(CF₂)₅OCF(CF₃)COONa | CF₃CF[O-O, CF, CF, O-O, O(CF₂)₅O]CFCF₃ (bicyclic) |
| NaOOCCF₂O(CF₂CF₂O)₃CF₂COONa | bicyclic peroxide + CF₂(O-O)CF₂–O–(CF₂CF₂O)₃ macrocycle |
| cyclic-C₆F₁₀(CF-CO₂Na) | three bicyclic/peroxide products with (CF₂)₄ and (CF₂)₅ rings |
| NaOOC-CF₂-COONa | CF-CF₂-CF with O-O and O-O bridges |
| (CF₂CF₂CO₂Na)₂ | CF(O-O)(O-O)FC–(CF₂)₄ bicyclic |
| O(CF₂CO₂Na)₂ | CF(O-O)(O-O)FC with CF₂-O-CF₂ bridge |
| FN(CF₂CO₂Na)₂ | CF(O-O)(O-O)FC with CF₂NFC-F₂ bridge |
| NaOC(=O)-CF₂-SF₂-CF₂-C(=O)ONa | CF(O-O)(O-O)FC with CF₂–SF₂–CF₂ bridge |

Where two oxygen atoms are attached to the same carbon atom, as in carboxylic acid salts, mixtures of monoperoxide and diperoxide compounds may result.

Inert gases, liquids and solids can be used as diluents for the organic oxygen-containing reactants. The finely divided reactant can be suspended in a liquid or a solid inert diluent. Sodium fluoride is an example of such a solid diluent. Among the fluorine-inert liquids which can be used as diluents in the process of the invention are perfluorinated hydrocarbons, e.g. perfluorooctanes, perfluorohexanes, and the like; perfluorocyclohexane; perfluorinated cyclic ethers such as perfluorobutylfuran; perfluorinated tertiary amines such as tris-perfluoro-n-butylamine; and the like. Commercially obtainable fluorocarbons may contain an amount of material which is not inert toward fluorine, and in such cases, fluorine gas is passed through the selected fluorocarbon for a time in small amounts just sufficient to render it substantially completely inert toward fluorine. When an inert liquid diluent is employed in the process of the invention, the hyperfluorinated reaction product generally dissolves in the diluent.

The fluorine and other gases used are conveniently introduced under slight positive pressure. Preferably, the fluorine is diluted with nitrogen or other inert gases such as argon or helium, or a "Freon," such as dichlorodifluoromethane or the like to give fluorine concentrations upwards of about 0.1 percent. Undiluted fluorine in the gas stream, can in many cases be used, although great caution and slow addition are required.

The reactant is placed in a suitable container with diluents or suspending media if desired, and is then contacted with fluorine for a period ranging from about 10 minutes to about 6 to 12 hours and upward, depending on the amount of starting material charged and the ease with which the fluorination is accomplished. Generally speaking, once the process has gone to completion, no further fluorine reacts so that when the products are volatile and thus are swept into the traps, continuation of the flow of fluorine is not deleterious. In the case of non-volatile solid or non-volatile liquid products, however, excessive exposure to fluorine should be avoided to eliminate the possibility that degradative reactions may occur. Residual fluorine should be flushed out of the reactants and the apparatus with dry nitrogen or the like after completion of the reaction to avoid unpleasant and toxic exposure to fluorine as well as untoward effects owing to the strong oxidizing power of this substance.

The desired products are ordinarily isolated from the reaction mixture by fractional condensation employing traps cooled with Dry Ice, liquid air, ice-salt mixtures and the like where the products are low-boiling, and other appropriate temperature controls where high boiling liquids or solids are produced. Where the products are collected in solvents, any insoluble material is removed by filtration and the product is recovered by evaporation of the solvent, preferably under reduced pressure. Fractionation may be necessary if separation of the product is desired although for some purposes, the reaction product mixture can be used as such. Ultimate separation of the products of the invention is conveniently accomplished by chromatographic techniques in small scale runs; in larger runs, other known methods of fractionation such as fractional distillation can be used. In the chromatographic separation of the products, the temperature is maintained at the minimum temperature at which convenient retention times are obtained. Alternative separation and purification can be accomplished by the usual means, taking into consideration the strongly oxidizing nature of the products, and maintaining temperatures at a minimum.

Crude or impure products of the invention are preferably stored well below room temperature, conveniently using solid carbon dioxide or liquid nitrogen as coolants.

The compounds of the invention are useful as oxidants, for example, for bleaching and the like and for oxidizing agents in chemical synthesis. They are especially useful in areas where fluorinated chains confer advantages owing to their special properties of solubility in fluorinated solvents and reduced solubility in other solvent systems. Also, as noted previously, they can be used as initiators in the polymerization of ethylenically unsaturated compounds.

The following specific examples illustrate the process and products of the invention. All parts are by weight in the examples unless otherwise specified.

EXAMPLE 1

The copper chelate of hexafluoroacetylacetone

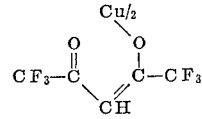

is prepared as described in the literature (A. L. Henne, M. S. Newman, L. L. Quill, and R. A. Staniforth, J. Am. Chem. Soc., 69, 1819 (1947)), M.P. 113–115° C., and is subjected to fluorination as follows:

The fluorination of the copper chelate of hexafluoroacetylacetone is carried out using a static bed procedure in a 450 cc. copper vessel of cylindrical shape, equipped with a gas inlet tube, a gas outlet tube, and a polychlorotrifluoroethylene rupture disk. A 1.6 g. sample of the copper chelate of hexafluoroacetylacetone (about 6.7 milliequivalents of hexafluoroacetylacetone) is placed in a copper tray in the copper fluorinating vessel. The reactor is immersed in a cooling bath at about −20° C. and flushed for 45 minutes with a stream of dry pre-purified nitrogen to displace air. Fluorine (commercially available, 95% pure) is introduced into the nitrogen stream (using monel metal fittings). The fluorine-nitrogen mixture is passed into the vessel and the volatile, entrained products formed are recovered from the effluent stream, which is passed through an iron tube containing granular sodium fluoride at room temperature to remove hydrogen fluoride (which is present in commercial fluorine and also is formed in the reaction) and then through a trap immersed in liquid air. A stream of about 3% (by volume) fluorine in nitrogen is passed through the reactor at a flow rate of about 0.016 cubic foot per minute for three hours (a total of 0.07 mole of fluorine).

The desired product is formed rapidly during the initial period of fluorine delivery and is produced more slowly during the later stages of the fluorination. The fluorine flow is then discontinued and the cooling bath removed; the reaction vessel is thereafter purged with nitrogen for one hour.

If the solid residues are then removed from the reactor, ground into fine powder, and returned to the reactor, further production of the desired material is achieved by repeating the fluorination procedure.

The contents of the liquid air trap are maintained at liquid air temperature until they are worked up as follows: The non-condensable gases are removed from the trap at liquid air temperature under reduced pressure, and the condensate is then allowed to warm slowly while it is fractionated at about 0.1 mm. pressure through the traps designated A, B and C. Trap A is cooled in a solid carbon dioxide-trichloroethylene bath at about −78° C., trap B in a bath of trichlorofluoromethane slush at about −111° C., and trap C in a bath of liquid nitrogen at about −196° C. Trap A is found to contain about 0.38 millimole of product, which is chiefly a mixture of cis- and trans- perfluoro - 3,5 - dimethyl-1,2-dioxolane. Trap B is found to contain a small amount of this compound along with other products. Cis- and trans-perfluoro-3,5-dimethyl-1,2-dioxolane is isolated in pure form from the product mixture by means of vapor phase chromatography. For this process a column 2 meters in length and ½ inch in diameter packed with silicone gum rubber (commercially available as SE-30, from General Electric Co., Inc.) (20%) coated on 30–60 mesh acid-washed filter aid (diatomaceous earth) (80%) and maintained at about 25° C. is used. An 8-volt thermistor is used as a detector. Helium is employed as a carrier gas at a flow rate of about 200 ml./min. Cis- and trans-perfluoro-3,5 - dimethyl - 1,2 - dioxolane are thus obtained. The yield of pure material thus obtained is about 5% of theoretical based on the amount of hexafluoroacetylacetone employed as the copper chelate. The cis-isomer is obtained in greater amount.

The structures of the products are as follows:

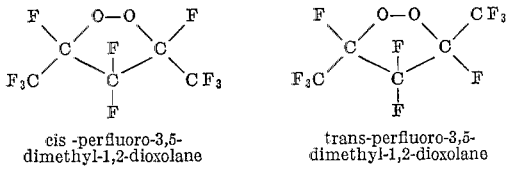

cis -perfluoro-3,5-dimethyl-1,2-dioxolane        trans-perfluoro-3,5-dimethyl-1,2-dioxolane Cis-perfluoro - 3,5 - dimethyl - 1,2-dioxolane is a clear, colorless liquid at room temperature. Its $F^{19}$ nuclear magnetic resonance spectrum contains absorptions at $75.7\phi$ (assigned to the $CF_3$ groups), at $128.5\phi$ (assigned to the CF group), and at $110\phi$ and $126\phi$ as an AB pattern (assigned to the magnetically-non-equivalent fluorines of the $CF_2$ group). All the absorptions are complex multiplets. The infrared spectrum of this material shows a strong absorption at 11.6 microns.

Trans-perfluoro-3,5 - dimethyl - 1,2-dioxolane is also a clear, colorless liquid at room temperature. Its $F^{19}$ nuclear magnetic resonance spectrum contains absorptions at $76.7\phi$ (assigned to the $CF_3$ groups), at $114\phi$ (assigned to the $CF_2$ group), and at $132.5\phi$ (assigned to the CF group). All the absorptions are complex multiplets. In the trans-isomer the fluorines of the $CF_2$ group are magnetically equivalent. The infrared spectrum of this material shows a medium intensity absorption at 11.45 microns. The infrared spectra of both isomers show strong absorptions in the region 7.5 to 9.5 microns.

Both isomers of perfluoro-3,5-dimethyl-1,2-dioxolane are immiscible with water and may be washed with water for periods up to 1 hour with no evidence for hydrolysis. Both isomers are recovered unchanged after exposure to mercury for thirty minutes. The trans-isomer is stable at room temperature for several months.

Analytical data on a sample of chromatographed cis- and trans-perfluoro-3,5 - dimethyl - 1,2-dioxolane were as follows:

Calculated for $C_5F_{10}O_2$ (percent): C, 21.4; F, 67.4. Found (percent): C, 21.4; F, 66.8.

A molecular weight determination for this material gave a value of 275; the calculated value is 282. The sample was found to have an oxidizing power of 6.8 milliequivalents of iodine per gram of sample (calculated for a two-electron change, 7.1). The mass cracking pattern of a sample of chromatographed cis- and trans-perfluoro - 3,5 - dimethyl - 1,2 - dioxolane shows peaks at m/e=69 (assigned to $CF_3$), 47 (assigned to CFO), 97 (assigned to $CF_3CO$), and 263 (assigned to the parent molecule minus one fluorine atom) in addition to many other peaks consistent with the structure.

EXAMPLE 2

2-hydroxy - 2 - trichloromethyl-1,3-dioxane is prepared by the dropwise addition of trichloroacetyl chloride to a stirred suspension of 1,3-propanediol in dry ether, as described by Hibbert and Greig, Can. J. Res., 4, 254 (1931). The residual liquid remaining after ether and hydrogen chloride are removed by evaporation under vacuum is used directly in the fluorination reaction.

The fluorination reaction is carried out in a brass rectangularly-shaped box reactor having a sintered Monel plate suspended across it. The vessel is equipped with a gas inlet tube below the sintered plate and a gas outlet tube and brass blow-out cap above it. A 2.0 g. sample of 2-hydroxy - 2 - trichloromethyl-1,3-dioxane is spread out on the sintered plate in the fluorinated vessel. The reaction is carried out over a 4-day period. On the first day, the reactor is immersed in a cooling bath at about −70° C., flushed with nitrogen, fluorine is introduced into the nitrogen stream, and the mixture is passed into the vessel. The effluent stream is passed through an iron tube containing sodium fluoride at room temperature to remove hydrogen fluoride and then through a trap immersed in liquid air to recover the volatile, entrained products. A stream of 3% (by volume) of fluorine in nitrogen is passed through the reactor at a flow rate of .02 cubic ft./min. for 7 hours. After 4 hours the temperature of the bath is raised to about −50° C. and the process continued at that temperature for the remainder of the 7-hour period. The reactor is purged with nitrogen for 1 hour, while being allowed to warm to room temperature, and the trap containing the volatile products is removed. The reactor is capped and allowed to stand overnight. On the second day, a new trap is connected to the exit line beyond the sodium fluoride scrubber. The reactor is immersed in a cooling bath at about −50° C. and a stream of 7% (by volume) fluorine in nitrogen is passed through the reactor at a rate of about .007 cubic ft./min. for 2 hours. For the following 5 hours, a concentration of 20% and a flow rate of about .008 cubic ft./min. are maintained. After 2 hours at this concentration the temperature of the cooling bath is raised to −20° C. and the process is continued to that temperature for the remainder of the 7-hour period. The reactor is purged with nitrogen for 1 hour, while being allowed to warm to room temperature, and the trap containing the volatile products is then removed. The reactor is capped and allowed to stand at room temperature overnight. On the third day, a new trap is connected to the exit line immediately following the sodium fluoride scrubber. The reactor is immersed in a cooling bath at about 0° C. and a stream of about 11% (by volume) fluorine in nitrogen is passed through the reactor at a rate of about .02 cubic ft./min. for 2 hours. For the next 5 hours a concentration of about 20% and a flow rate of about .008 cubic ft./min. are maintained. After 3 hours the cooling bath is removed and the reaction vessel is allowed to warm to room temperature (about 20° C.); the fluorination is continued during the warming and for the remainder of the 5-hour period. The reactor is purged with nitrogen for 1 hour, after which the trap containing the volatile products is removed. The reactor is capped and allowed to stand overnight. On the fourth day, a new trap is connected to the exit line beyond the sodium fluoride scrubber. A stream of 24% (by volume) fluorine in nitrogen is passed through the reactor at a rate of about .02 cubic ft./min. for 1 hour. For the next 6 hours a concentration of about 36% (by volume) fluorine in nitrogen and a flow rate of .01 cubic ft./min. are maintained. After 1 hour at this concentration the temperature is raised to about 38° C. and maintained there for the remainder of the 6-hour period. The reactor is purged with nitrogen for 1 hour, while it is allowed to cool to room temperature. A total of 2.50 moles of fluorine is introduced into the reactor during the 4-day period.

Only a very small quantity of volatile products is formed on the first and second days. A somewhat larger quantity is obtained on the third day, but the major proportion of the products is obtained on the fourth day. The crude products are stored well below room temperature. The products of the fourth day are removed under reduced pressure from the trap which was at liquid air temperature, and fractionated at about 1 mm. pressure through the traps A (−78° C.), B (−111° C.), and C (−196° C.), successively. Trap A is found to contain more than 1.8 millimoles of products, which include hexafluoro-1,2-dioxolane 2,2,2-trichloro - 1,1 - difluoroethyl oxyfluoride, 2,2-dichloro-1,1,2-trifluoroethyl oxyfluoride, 1,3-bis(fluoroxy)hexafluoropropane, and 3-fluoroxytetrafluoropropionyl fluoride. Trap B is found to contain about 0.8 millimole of products, including hexafluoro-1,2-dioxoane, 1,3-bis(fluoroxy)hexafluoropropane, 3-fluoroxytetrafluoropropionyl fluoride, 2,2-dichloro-1,1,2-trifluoroethyl oxyfluoride, 2-chlorotetrafluoroethyl oxyfluoride, and pentafluoroethyl oxyfluoride. Trap C is found to contain about 4.8 millimoles of products, including carbon dioxide, carbonyl fluoride, and pentafluoroethyl oxyfluoride. The pure oxyfluorides are isolated from these mixtures by vapor phase chromatography.

Pure hexafluoro-1,2-dioxolane is isolated from these mixtures by first washing the mixtures with water and then vapor phase chromatography of the resulting mixtures. A column of perfluorotributylamine coated on acid-washed Celite operated at 0° C. is used.

*Analysis.*—Calc'd for $C_3F_6O_2$ (percent): C, 19.7; F, 62.8. Found (percent): C, 19.9; F, 62.5.

The $F^{19}$ nuclear magnetic resonance spectrum of hexafluoro-1,2-dioxolane shows an absorption at $+125.0\phi$ (fivefold) for the center $CF_2$ group and an absorption at $+96.6\phi$ (triplet) for the $CF_2$ groups adjacent to the peroxide group. The coupling constant is 3.3 c./s.

EXAMPLE 3

The fluorination of the nickel chelate of hexafluoroacetylacetone is carried out using a static bed procedure in a 450 cc. copper vessel of cylindrical shape, equipped with a gas inlet tube, a gas outlet tube, and a polychlorotrifluoroethylene rupture disk, as set forth in Example 1. A 1.7 g. sample of the nickel chelate of hexafluoroacetylacetone (about 7.2 milliequivalents of hexafluoroacetylacetone) is placed in a copper tray in the copper fluorinating vessel. The reactor is immersed in a cooling bath at about −20° C. and flushed for one hour with a stream of dry prepurified nitrogen to displace air. Fluorine (commercially available, 95% pure) is introduced into the nitrogen stream (using Monel metal fittings). The fluorine-nitrogen mixture is passed into the vessel and the volatile, entrained products formed are recovered from the effluent stream, which is passed through an iron tube containing granular sodium fluoride at room temperature to remove hydrogen fluoride (which is present in commercial fluorine and also is formed in the reaction) and then through a trap immersed in liquid air. A stream of about 2.3% (by volume) fluorine in nitrogen is passed through the reactor at a flow rate of about 0.02 cubic feet per minute for six hours (a total of 0.15 mole of fluorine). The desired product is formed rapidly during the initial period of fluorine delivery and is produced more slowly during the later stages of the fluorination. The fluorine flow is then discontinued and the cooling bath removed; the reaction vessel is thereafter purged with nitrogen for one hour.

The contents of the liquid air trap are maintained at liquid air temperature until they are worked up as follows: the non-condensable gases are removed from the trap at liquid air temperature under reduced pressure, and the condensate is then allowed to warm slowly while it is fractionated at about 0.1 mm. pressure through the traps designated A and B. Trap A is cooled in a solid carbon dioxide-trichloroethylene bath at about −78° C., and trap B is cooled in a bath of liquid nitrogen at about −196° C. Trap A is found to contain about 0.28 millimole of product, which is chiefly cis- and trans-perfluoro-3,5-dimethyl-1,2-dioxolane. This material is isolated in pure form by chromatography by the procedure set forth in Example 1.

EXAMPLE 4

The sodium salt of trifluoroacetic acid is fluorinated by the static bed procedure in a brass rectangular-shaped box reactor having a sintered Monel plate suspended across it. The vessel is equipped with a gas inlet tube below the sintered plate and a gas outlet tube and brass blow-out cap above it. A 2.1 g. sample of sodium trifluoroacetate (about 15.6 millimoles) is spread out on the sintered plate in the fluorinating vessel. The reactor is flushed with nitrogen, fluorine is introduced into the nitrogen stream, and the mixture is passed into the vessel. The effluent stream is passed through an iron tube containing sodium fluoride at room temperature to remove any hydrogen fluoride and then through a trap immersed in liquid air. A stream of about 4% (by volume) of fluorine in nitrogen is passed through the reactor at a flow rate of 0.01 cubic ft./min. for 15 minutes, then a 20% stream at a flow rate of .007 cubic ft./min. for 1 hour, and finally a 34% stream at a flow rate of .004 cubic ft./min. for 2 hours. During this 3½ hour reaction period a total of 0.30 mole of fluorine is introduced into the reactor; the temperature inside the reactor varies from 17–22° C. The fluorine flow is discontinued and the reaction vessel is then purged with nitrogen for ½ hour. The residual material in the reactor is found to weigh about 0.6 g.; it consists principally of $NaHF_2$ and $NaF$.

The non-condensable gases are removed from the trap at liquid nitrogen temperature under reduced pressure. The liquid air trap is found to contain 9.3 millimoles of condensed products, including the two isomers, cis- and trans-perfluoro-3,6-dimethyl-s-tetroxane. This material is isolated in pure form from the mixture by means of gas chromatography. For this process a column 8'7" in length and ½" in diameter packed with perfluorotributylamine (33%) coated on 30–60 mesh acid-washed filter aid (diatomaceous earth) (67%) and maintained at about 0° C. is used. An 8-volt thermistor is used as the detector. Helium is employed as the carrier gas at a flow rate of 130 ml./min. The pure products are obtained by passing the stream from the chromatograph exit through cooled traps as the respective components elute. The components eluting with a retention time of approximately 580 relative to $CFCl_3$ under identical chromatography conditions are the isomers, cis-perfluoro-3,6-dimethyl-s-tetroxane and trans-perfluoro-3,6-dimethyl-s-tetroxane.

Using a column 12' in length and ¼" in diameter packed in the same manner as the column described in the previous paragraph maintained at about 23° C. at a flow rate of about 40 ml./min. with helium as the carrier gas, the isomers cis- and trans-perfluoro-3,6-dimethyl-s-tetroxane elute at a retention time of approximately 544 relative to $CFCl_3$.

The $F^{19}$ nuclear magnetic resonance spectrum of the isolated gas chromatography fraction indicates that the relative abundance of the two isomers is approximately 1:3. The isomer present in the greater amount is considered to be the transisomer. Its spectrum contains two peaks, one at $82.4\phi$ due to the $CF_3$ group and one at $107.1\phi$ due to the CF group. The $F^{19}$ nuclear magnetic resonance spectrum of the cis-isomer has corresponding peaks at $82.1\phi$ and $106.9\phi$.

The infrared spectrum of the mixture of isomers shows the following absorptions: 7.37(m.), 8.08(s.), 8.25(s.), 8.55(m.), 8.73(m.), 9.23(m.), 9.40(s.), 11.84(w.), 13.3(w.) and 13.68(w.) microns.

The mass spectrum is in good agreement with the assigned structure, the molecular weight is found to be 263.7 (theoretical 264.0) and the elemental analyses are as follows:

Calc'd for $C_4F_8O_4$ (percent): C, 18.18; F, 57.58. Found (percent): C, 17.7; F, 57.0.

EXAMPLE 5

The copper chelate of 3-nitroacetylacetone is prepared from acetylacetone, copper (II) nitrate trihydrate, and acetic anhydride according to the procedure described in the literature (J. P. Collman, R. L. Marshall, W. L. Young III, and S. D. Goldby, Inorg. Chem. 1, 704 (1962)).

The fluorination of the copper chelate of 3-nitroacetylacetone is carried out using a static bed procedure in a 450 cc. copper vessel as described in Example 1. A 1.5 g. sample of the chelate is placed on a copper tray in the copper fluorinating vessel. The vessel is immersed in a cooling bath at about −20° C. and flushed for 45 minutes with a stream of dry prepurified nitrogen to displace air. Fluorine is introduced into the nitrogen stream, and the fluorine-nitrogen mixture is passed into the vessel. The volatile, entrained products formed are recovered from the effluent stream, which is passed through an iron tube containing granular sodium fluoride at room temperature to remove hydrogen fluoride (which is present in commercial fluorine and also is formed in the reaction) and then through a trap immersed in liquid air. A stream of about 3% (by volume) fluorine in nitrogen is passed through the reactor at a flow rate of about 0.016 cubic foot per minute for six hours (a total of 0.15 mole of fluorine). The fluorine flow is then discontinued and the cooling bath removed; the reaction vessel is thereafter purged with nitrogen for one hour.

The contents of the liquid air trap are maintained at liquid air temperature until they are worked up as follows: the non-condensable gases are removed from the trap at liquid air temperature under reduced pressure, and the condensate is then allowed to warm slowly while it is fractionated at about 0.1 mm. pressure through the traps designated A and B. Trap A is cooled in a solid carbon dioxide-trichloroethylene bath at about −78° C., and Trap B is cooled in a bath of liquid nitrogen at about −196° C.

Trap A is found to contain the product, 4-nitroperfluoro-3,5-dimethyl-1,2-dioxolane, which is present as a mixture of isomers. The product may be purified by vapor phase chromatography by the procedure given in Example 1.

Thus is obtained 4-nitroperfluoro-3,5-dimethyl-1,2-dioxolane, which has the following structure:

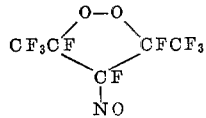

This compound is identified by its infrared and nuclear magnetic resonance spectra. 4-nitroperfluoro-3,5-dimethyl-1,2-dioxolane is an oxidizing agent. It readily liberates iodine from solutions of potassium iodide and oxidizes ferrocene suspended in fluoroinated solvents.

EXAMPLE 6

The copper chelate of 3-chloroacetylacetone is prepared by chlorination of the corresponding chelate of acetylacetone with N-chlorosuccinimide according to the procedure described in the literature (J. P. Collman, R. A. Moss, H. Maltx, and C. C. Heindel, J. Am. Chem. Soc., 83, 531 (1961)).

The fluorination of the copper chelate of 3-chloroacetylacetone is carried out using a static bed procedure in a 450 cc. copper vessel as described in Example 1. A 1.5 g. sample of the chelate is placed on a copper tray in the copper fluorinating vessel. The vessel is immersed in a cooling bath at about −20° C. and flushed for 45 minutes with a stream of dry, prepurified nitrogen to displace air. Fluorine is then introduced into the fluorine stream, and the fluorine-nitrogen is passed into the vessel. The volatile, entrained products formed are recovered from the effluent stream, which is passed through an iron tube containing granular sodium fluoride at room temperature to remove hydrogen fluoride (which is present in commercial fluorine and also is formed in the reaction) and then through a trap immersed in liquid air. A stream of about 3% (by volume) fluorine in nitrogen is passed through the reactor at a flow rate of about 0.016 cubic foot per minute for six hours (a total of 0.15 mole of fluorine). The fluorine flow is then discontinued and the cooling bath removed; the reaction vessel is thereafter purged with nitrogen for one hour.

The contents of the liquid air trap are maintained at liquid air temperature until they are worked up as follows: the non-condensable gases are removed from the trap at liquid air temperature under reduced pressure, and the condensate is then allowed to warm slowly while it is fractionated at about 0.1 mm. pressure through the traps designated A and B. Trap A is cooled in a solid carbon dioxide-trichloroethylene bath at about −78° C., and trap B is cooled in a bath of liquid nitrogen at about −196° C.

Trap A is found to contain the product, 4-chloro-perfluoro-3,5-dimethyl-1,2-dioxolane, which is present as a mixture of isomers. The product may be purified by vapor phase chromatography by the procedure given in Example 1.

Thus is obtained 4-chloro-perfluoro-3,5-dimethyl-1,2-dioxolane, which has the following structure.

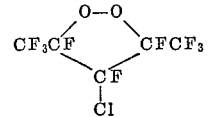

The compound is identified by its infrared and nuclear magnetic resonance spectra. The compound is an oxidizing agent. It readily liberates iodine from solutions of potassium iodide and oxidizes ferrocene suspended in fluorinated solvents.

EXAMPLE 7

The copper chelate of 5,5-dihydroperfluoropentadecane-4,6-dione is prepared from methyl perfluoro-n-decanoate and methyl perfluoro-n-propyl ketone according to the procedure described in the literature for the preparation of the copper chelate of hexafluoroacetylacetone (see Example 1).

The fluorination of the copper chelate of 5,5-dihydroperfluoropentadecane-4,6-dione is carried out using a static bed procedure in a 450 cc. copper vessel as described in Example 1. A 1.5 g. sample of the starting material is placed in a copper tray in the copper fluorinating vessel. The vessel is immersed in a cooling bath at about −20° C. and flushed for 45 minutes with a stream of dry prepurified nitrogen to displace air. Fluorine is introduced into the nitrogen stream and the fluorine-nitrogen mixture is passed into the vessel. A stream of about 3% (by volume) fluorine in nitrogen is passed through the reactor at a flow rate of about 0.016 cubic foot per minute for three hours (a total of 0.07 mole of fluorine). A longer reaction time may be used if desired. The fluorine flow is then discontinued and the cooling bath removed; the reaction vessel is thereafter purged with nitrogen for one hour.

The contents of the reactor are then extracted with a suitable solvent and the product is recovered by removal of the solvent from the extract at room temperature or below. Thus is obtained perfluoro-3-n-nonyl-5-n-propyl-1,2-dioxolane, which has the following structure.

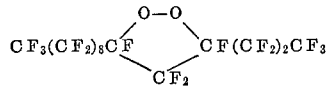

This compound may exist in both cis- and trans-isomeric forms. The compound is identified by its infrared and fluorine nuclear magnetic resonance spectra. Further purification is accomplished by liquid column chromatography. Care must be taken during this procedure to avoid exposing the compound to temperatures higher than room temperature for extended periods of time. The peroxide is soluble in fluorinated solvents and insoluble in water; hence extraction procedures may be used in the purification steps.

Perfluoro-3-n-nonyl-5-n-propyl-1,2-dioxolane is an oxidizing agent. It readily liberates iodine from solutions of potassium iodide and oxidizes ferrocene suspended in fluorinated solvents.

EXAMPLE 8

The sodium salt of chlorodifluoroacetic acid (sodium chlorodifluoroacetate, ClCF$_2$CO$_2$Na) is fluorinated by the static bed procedure in a 1550 cc. cylindrical copper vessel, equipped with a gas inlet tube, a gas outlet tube, and a ead rupture disk. A 1.9 g. sample of sodium chlorodifluoroacetate (about 12.5 millimoles) is placed in a copper tray in the fluorinating vessel. The reactor is flushed with a stream of nitrogen, and fluorine is introduced into the nitrogen stream. The volatile reaction products are passed through an iron tube containing sodium fluoride at room temperature and then through a trap immersed in liquid air. A stream of about 5% (by volume) of fluorine in nitrogen is passed through the reactor at a flow rate of .02 cubic ft./min. for 30 minutes and then a 10% stream at a flow rate of .007 cubic ft./min. for 5 hours. During this 5½ hour reaction period a total of 0.27 mole of fluorine is introduced into the reactor; the temperature inside the reactor varies from 15–19° C. The fluorine flow is discontinued and the reaction vessel is then purged with nitrogen for ½ hour. The residual material in the reactor is found to weigh about 0.6 g.; it consists principally of NaHF$_2$ and NaF.

The contents of the liquid air trap are worked up as follows: The non-condensable gases are removed from the trap at liquid nitrogen temperature under reduced pressure, and the condensate is then allowed to warm slowly while it is fractionated at about 0.1 mm. pressure through traps designated A and B. Trap A is cooled in solid carbon dioxide-trichloroethylene (−78° C.) and trap B is in liquid nitrogen (−196° C.). Trap A is found to contain liquid products including 3,6-difluoro-3,6-bis(chlorodifluoromethyl)-s-tetroxane. Identification is made from infrared and F$^{19}$ nuclear magnetic resonance spectra.

EXAMPLE 9

The dilithium salt of hexafluoro-2,2-propanediol is prepared and the compound

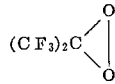

prepared from it as follows:

A solution of 28.4 grams of hexafluoro-2,2-propanediol in 100 milliliters of water is carefully titrated to pH 8.0 with aqueous normal lithium hydroxide solution. Most of the water is then removed in a stream of dry air at room temperature, and the resulting syrupy mass is dried in a vacuum desiccator. A solid white residue remains (29.50 grams, about 90 percent of theoretical yield) and is identified as the hydrated monolithium salt of hexafluoro-2,2-propanediol by its infrared and F$^{19}$ N.M.R. spectra.

*Analysis.*—Calc'd for C$_3$HF$_6$O$_2$Li·1.5H$_2$O (percent): C, 16.4; H, 1.8; F, 52.2. Found (percent): C, 16.8; H, 1.7; F, 52.4.

The hydrated monolithium salt of hexafluoro-2,2-propanediol (29.5 grams) is heated under high vacuum at 100° C. and the volatile products are condensed into a trap which is then cooled to −196° C. The volatile products are identified as hexafluoro-2,2-propanediol, water and hexafluoroacetone by their characteristic infrared spectra. A solid residue remains (13.9 grams, about 94 percent of theoretical yield) and is identified as the anhydrous dilithium salt of hexafluoro-2,2-propanediol by its infrared and F$^{19}$ N.M.R. spectra.

*Analysis.*—Calc'd for C$_3$F$_6$O$_2$Li$_2$ (percent): C, 18.3; F, 58.2; Li, 7.2. Found (percent): C, 18.2; F, 55.2; Li, 7.01.

This compound decomposed rapidly at 150° C.

A 0.418 g. (2.14 mmole) sample of dry (CF$_3$)$_2$C(OLi)$_2$ is fluorinated using the following conditions: 7.5% F$_2$(N$_2$ diluent) at 100 cc./min. for 30 minutes followed by 15% F$_2$ at 75 cc./min. for 2½ hours. Total F$_2$ passed through the reactor is approximately 25 mmoles. The residue (as determined by IR and powder X-ray spectroscopy) is largely LiF together with small Li$_2$SiF$_6$ and probably some CF$_3$CO$_2$Li and a trace of unidentified material.

The volatile products are fractionated through traps cooled to −78°, −119° and −196°. The −196° fraction (2.96 mmoles) and −119° fraction (0.92 mmole) are subjected to gas chromatography to separate the various products therein. This is performed using a 3 m. (n-C$_4$F$_9$)$_3$N column at −30° C. with a flow rate of 150 cc./min. The component eluting at 22.7 min. is examined carefully using various techniques and found to be

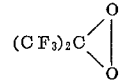

The yield of this compound (based on mmoles of starting material used, mmoles of product obtained and GLC area ratios) is 53% of theory. Since the compound is explosive and unstable, it is likely that an even higher yield is originally formed in the reaction.

The F$^{19}$ N.M.R. spectrum of (CF$_3$)$_2$CO$_2$ shows only one absorption, a strong singlet at 76.8$\phi$ and its infrared spectrum shows the following absorptions: 7.39(s.), 7.84(s.), 8.10(s.), 825 (shoulder), 9.00(w.), 9.78(w.), 10.25(s.), and 14.01(m.) microns.

This new compound has a pale yellow color in its liquid or solid states. Absorption spectroscopy in the visible and ultraviolet region (8000 A. to 2100 A.) of (CF$_3$)$_2$CO$_2$ in the gas phase shows a broad, moderately weak absorption band ($\lambda_{max}$=306 m$\mu$) extending very weakly into the violet and blue part of the visible spectrum. This suggests a very pale yellow color for gaseous (CF$_3$)$_2$CO$_2$ as well. Below 220 m$\mu$, a second absorption band of (CF$_3$)$_2$CO$_2$ begins to rise sharply. The mass spectrum and molecular weight of (CF$_3$)$_2$CO$_2$ also are consistent with the assigned structure. The empirical formula is also established as C$_3$F$_6$O$_2$ by elemental analysis.

Calc'd for C$_3$F$_6$O$_2$ (percent): C, 19.78; F, 62.64. Found (percent): C, 20.0; F, 63.3.

The gas chromatography retention time of (CF$_3$)$_2$CO$_2$ relative to CFCl$_3$ is 82. Under identical conditions, the retention time of (CF$_3$)$_2$CO relative to CFCl$_3$ is 30.

The fluorination of the monolithium salt of hexafluoro-2,2-propanediol (see above) (J. Am. Chem. Soc. 89, 2263 (1967)) also yields perfluorodimethyldioxirane. The fluorination conditions are similar to those described above.

EXAMPLE 10

The dilithium salt of chloropentafluoro-2,2-propanediol is prepared and the compound

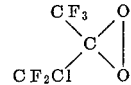

is prepared from it as follows:

In the manner described in Example 9, chloropentafluoro-2,2-propanediol is converted into the hydrated monolithium salt, and subsequently the anhydrous dilithium salt is recovered. This compound decomposes rapidly at 115° C.

A 0.299 g. sample of dried CF$_2$Cl(CF$_3$)C(OLi)$_2$ is fluorinated at room temperature using the following concentrations and flow-rates of fluorine: 7.5 mole percent F$_2$ (N$_2$ diluent at 100 cc./min. for 30 minutes followed by 15 mole percent F$_2$ at 50 cc./min. for two hours. Total F$_2$ passed through the reactor is approximately 25 mmoles.

The volatile products contained in a liquid oxygen trap are fractionated through traps cooled at −78° C., −119° C., and −196° C. using vacuum line techniques. The majority of the products are found in the −196° C. fraction (2.25 mmoles). The −119° C. fraction contains 0.35 mmole and the −78° C. fraction contains only 0.02 mmole.

The −196° C. fraction (pale yellow in solid phase) and the −119° C. fraction (yellow in solid and liquid phase) are subjected to gas chromatography to separate the various products therein. Chlorodifluoromethyltrifluoromethyldioxirane

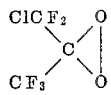

is isolated from these fractions and identified by $F^{19}$ N.M.R. infrared, and mass spectroscopy, as well as molecular weight.

The $F^{19}$ nuclear magnetic resonance spectrum of $CF_2Cl(CF_3)CO_2$ shows two absorptions, one at approximately 65.0ϕ (assigned to $CF_2Cl$ group) and one at approximately 74.6ϕ (assigned to $CF_3$ group). The relative area ratios of the two peaks are in the correct ratio of approximately 2:3. The infrared spectrum of $$CF_2Cl(CF_3)CO_2$$

shows the following absorptions: 7.08(w.), 7.63(m.), 8.05(s.), 8.23(s.), 8.70(m.), 9.54(m.), 9.90(w.), 11.13(m.), 11.65(m.), 13.17(w.), and 14.08(w.) microns. The mass spectrum of $CF_2Cl(CF_3)CO_2$ also is consistent with the assigned structure.

The fluorination of the monolithium salt of chloropentafluoro-2,2-propanediol (see above) also yields the chlorodifluoromethyltrifluoromethyldioxirane. The fluorination conditions are similar to those for the disalt.

What is claimed is:
1. A compound of the formula

wherein R is fluorine or completely halo-substituted alkyl of not more than 9 carbon atoms, said halo being limited to fluorine only, or at most, one chlorine atom replacing a fluorine atom and the compound contains not more than 10 carbon atoms, at least one R being other than fluorine.

2. A compound according to claim 1 wherein each R is a completely halo-substituted methyl.
3. Perfluorodimethyldioxirane.
4. Chlorodifluoromethyltrifluoromethyldioxirane.
5. The process of preparing a compound of the formula

wherein R is fluorine or completely halo-substituted alkyl of not more than 9 carbon atoms, said halo being limited to fluorine only, or at most, one chlorine atom replacing a fluorine atom and the compound contains not more than 10 carbon atoms, at least one R being other than fluorine, which comprises directly fluorinating with elemental fluorine at a temperautre of from about −100° to +50° C. a compound having 2 oxygen atoms bonded to the same carbon atom to effect ring closure to form the 3-membered ring containing the peroxide group.

References Cited

UNITED STATES PATENTS

| | | | |
|---|---|---|---|
| 2,570,435 | 10/1951 | Downing et al. | 260—648 |
| 2,871,260 | 1/1959 | Drysdale | 260—648 |
| 3,030,408 | 3/1962 | Inman et al. | 260—694 |
| 3,149,126 | 9/1964 | Milas | 260—338 |

ALEX MAZEL, Primary Examiner

J. H. TURNIPSEED, Assistant Examiner

U.S. Cl. X.R.

252—186; 260—93.7, 297.4, 327, 340.6, 340.9, 687

UNITED STATES PATENT OFFICE
CERTIFICATE OF CORRECTION

Page 1

Patent No. 3,632,606          Dated January 4, 1972

Inventor(s) Richard L. Talbott and Phillip G. Thompson

It is certified that error appears in the above-identified patent and that said Letters Patent are hereby corrected as shown below:

Column 2, Table I, 1st formula in 3rd set

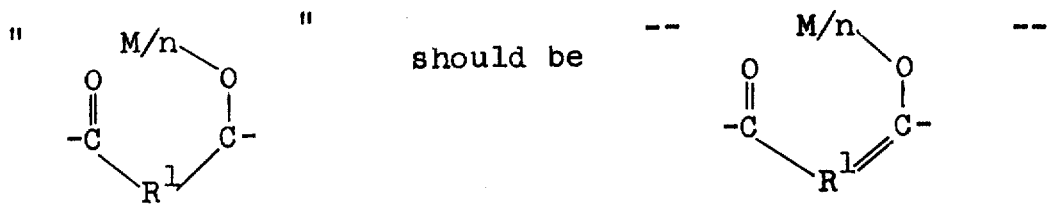

Column 2, Table I, 1st formula in 4th set

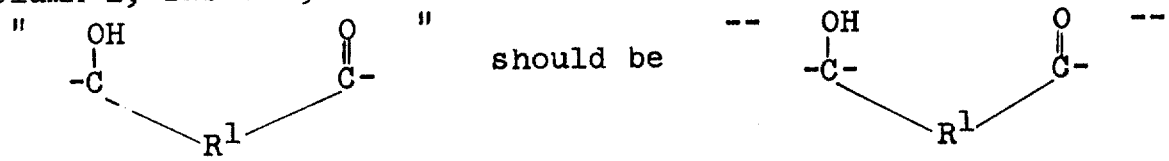

Column 2, Table I, 2nd formula in 4th set

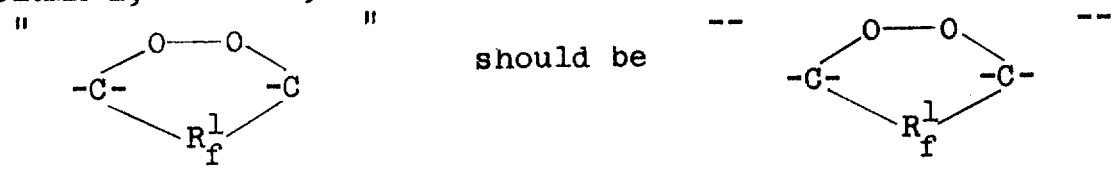

Column 5, 1st column, 3rd formula

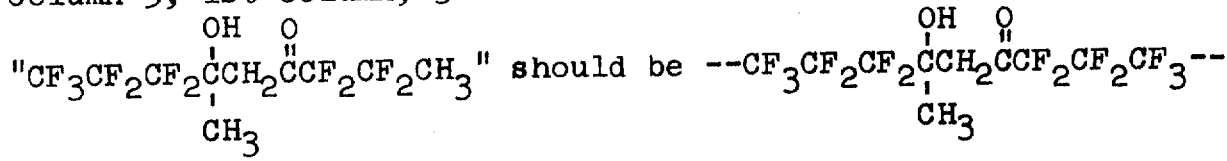

UNITED STATES PATENT OFFICE
CERTIFICATE OF CORRECTION

Page 2

Patent No. 3,632,606                    Dated January 4, 1972

Inventor(s) Richard L. Talbott and Phillip G. Thompson

It is certified that error appears in the above-identified patent and that said Letters Patent are hereby corrected as shown below:

Column 13, line 31-formula

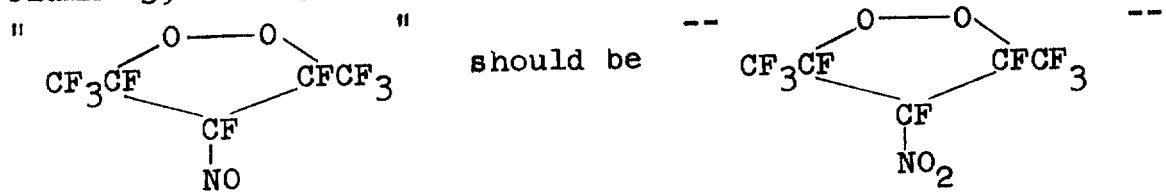

Column 16, line 20, "825" should be --8.25--

Column 16, line 62, "($N_2$ diluent " should be --($N_2$ diluent)--

Signed and seald this 18th day of July 1972.

(SEAL)
Attest:

EDWARD M. FLETCHER, JR
Attesting Officer

ROBERT GOTTSCHALK
Commissioner of Patents